United States Patent [19]
Lanning

[11] 3,787,775
[45] Jan. 22, 1974

[54] PHASE CORRECTION CIRCUIT

[75] Inventor: Ronald L. Lanning, Palos Verdes Peninsula, Calif.

[73] Assignee: TRW Inc., Redondo Beach, Calif.

[22] Filed: Mar. 28, 1973

[21] Appl. No.: 345,668

[52] U.S. Cl. .................... 329/122, 178/88, 325/320, 325/419, 328/155, 331/23, 332/23 R
[51] Int. Cl. .......................... H03d 3/24, H03b 3/04
[58] Field of Search.. 329/122, 124; 331/18, 23, 25; 325/419, 320; 178/88; 332/23 R, 23 A; 328/155; 307/295

[56] References Cited

UNITED STATES PATENTS

| | | | |
|---|---|---|---|
| 3,199,037 | 8/1965 | Graves | 328/155 |
| 3,238,459 | 3/1966 | Landee | 329/124 X |
| 3,453,552 | 7/1969 | Whang et al. | 328/155 |
| 3,553,590 | 1/1971 | Hofgen | 328/155 X |

*Primary Examiner*—Alfred L. Brody
*Attorney, Agent, or Firm*—Daniel T. Anderson, Esq.; Edwin A. Oser, Esq.; Jerry A. Dinardo

[57] ABSTRACT

A phase correction circuit for a demodulator for a phase-shift keying, suppressed-carrier communication system. The demodulator for such a coherent phase detector requires means for reintroducing the carrier in proper phase and frequency. To this end a phase-locked loop demodulator is conventionally used including a phase correction circuit sometimes called an I-Q multiplier. The invention provides an improved phase correction circuit which will generate a phase-corrected loop error signal to keep the phase-locked loop locked in phase even during the period when the input signal reverses its polarity. The phase correction circuit includes a reference oscillator and hence operates at an alternating-current signal rather than a direct-current signal.

6 Claims, 1 Drawing Figure

PATENTED JAN 22 1974 3,787,775
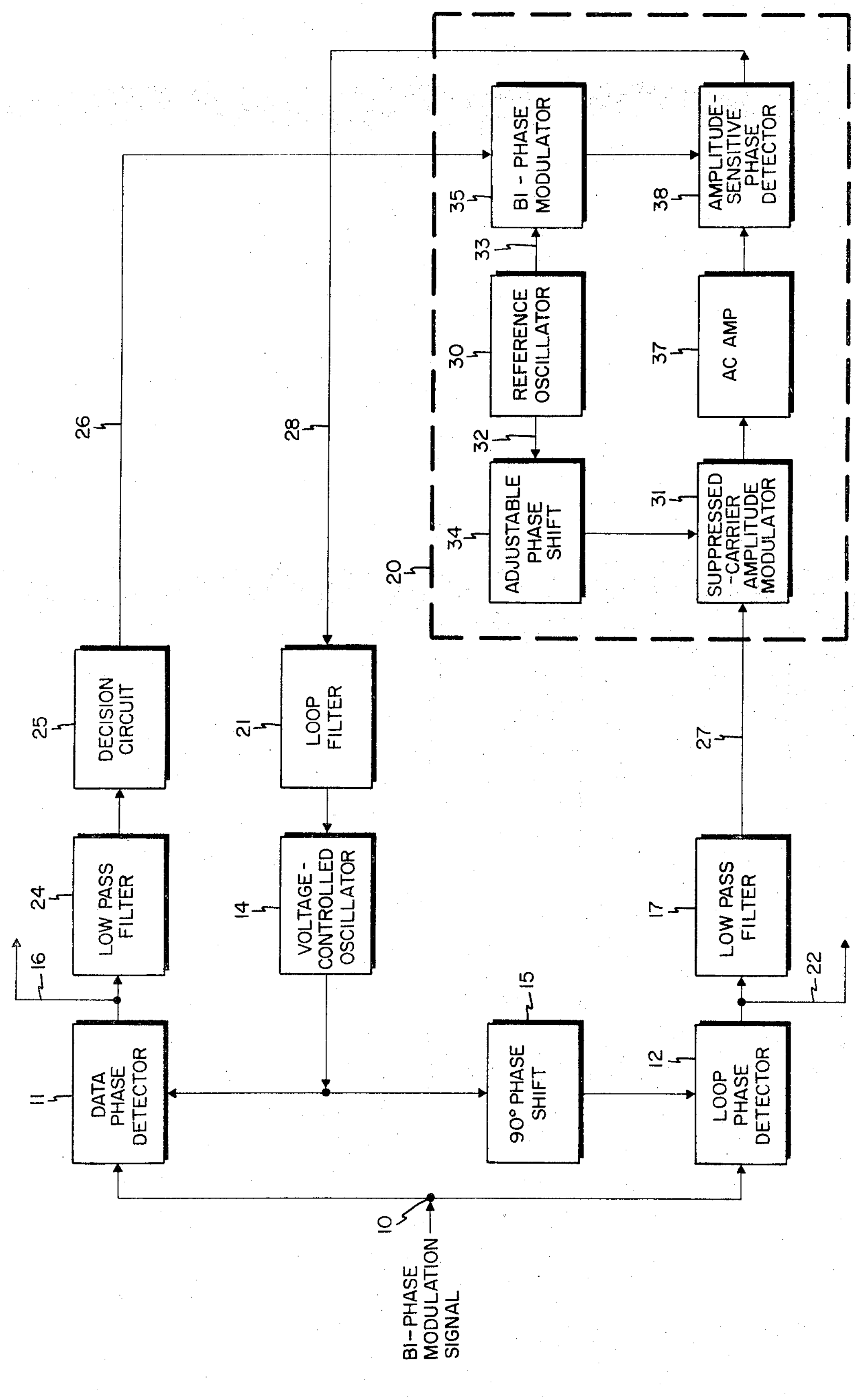

PHASE CORRECTION CIRCUIT

BACKGROUND OF THE INVENTION

This invention relates generally to a demodulator for a phase-modulated carrier wave communication system and particularly relates to the phase correction circuit forming part of the phase-locked loop of a demodulator for such a system.

Various communication systems are known in the art. Among these is a phase-modulated carrier system suitable particularly for transmitting digital information. One such system uses phase-shift keying where the phase of the carrier is shifted between 0° and 180° in order to transmit information. This is sometimes referred to as a bi-phase modulation system. Such a modulated signal is generally transmitted as a suppressed-carrier signal whereby the carrier frequency is suppressed and all of the energy appears in the modulation sidebands.

In order to demodulate such a bi-phase modulated, suppressed-carrier signal it is necessary to provide a coherent demodulator or phase detector. This requires the reintroduction of the carrier which has been suppressed at the transmitter. The reintroduced carrier must be accurate in frequency and phase to permit the coherent detection.

To this end a phase-locked loop may be used of the type disclosed by J. P. Costas in Proceedings IRE, volume 44, pages 1,713 to 1,718, December, 1956. Such a Costas loop demodulator requires a phase correction circuit which is sometimes referred to as an I-Q multiplier which derives its name from the fact that the circuit multiplies an in-phase signal with a quadrature-phase signal.

Conventional phase correction circuits for a Costas loop demodulator have various drawbacks. They require direct-current (DC) amplifiers which must be high-speed, operational amplifiers to provide the necessary DC coupling and high data transmission. Nevertheless, operational amplifiers have a frequency limitation which prevents the transmission of high bit rates such as megabits. Additionally, DC amplifiers require careful balancing and temperature compensation which may be due to amplifier drift. Finally, since the phase correction circuit or multiplier requires four operational amplifiers considerable additional power is needed for the demodulator.

It is accordingly an object of the present invention to provide an improved phase-correction circuit or multiplier which permits operation at a high bit rate and which is not limited by the video frequency response.

Another object of the present invention is to provide a circuit of the type discussed which requires a minimum of power and adjustments for balance and where oscillator phase variations are automatically cancelled because the system is phase coherent.

A further object of the invention is to permit the use of an AC (alternating-current) amplifier rather than DC amplifiers which avoids the problems inherent in DC amplifiers including their lack of stability and drift.

SUMMARY OF THE INVENTION

The phase correction circuit of the present invention may be used for correcting the phase of a voltage-controlled oscillator and may form part of a phase-locked loop demodulator. However the circuit of the invention may be used wherever it is necessary to correct the polarity or sense of a signal on command and may include servo mechanisms, quadriphase demodulation and the like in addition to its use as a multiplier for a coherent phase detector. However for convenience the present invention will not be described in connection with a coherent phase detector of the type including a phase-locked loop demodulator.

Accordingly the demodulator including the phase correction circuit of the invention may be used for demodulating a bi-phase modulated, suppressed-carrier signal sometimes called a phase-shift keyed, suppressed-carrier signal. The phase locked loop demodulator includes a data phase detector and a loop phase detector both being coupled to a source of input signals. The two detectors are connected through a 90° phase shift network. First means are coupled to the loop phase detector which generates a direct-current loop error signal which, however, is an uncorrected error signal. A voltage-controlled oscillator has its output connected between the data detector and the phase shift network. Specifically this first means generates a direct-current loop error signal of one polarity in response to the phase difference between the input signal and the phase shifted reference signal being between 0° and 90°. However, the loop error signal is of the opposite polarity when this phase difference is between 90° and 180°.

Second means are coupled to the data phase detector for generating a phase change signal of one polarity when the output of the data phase detector is of a predetermined polarity and for generating a phase change signal of the opposite polarity when the data phase detector output is of a polarity opposite to the predetermined polarity.

The phase correction circuit of the invention now receives both the loop error signal and the phase change signal to derive a corrected loop error signal. The purpose of this is to correct the phase of the voltage-controlled oscillator of the phase-locked loop.

This phase correction circuit includes a suppressed carrier amplitude modulator coupled to the first means, that is to the output of the loop phase detector. There is further provided a reference oscillator having one of its two outputs coupled to the amplitude modulator. A bi-phase modulator which accomplishes the phase shift keying is coupled to the second means, that is eventually to the data phase detector. The reference oscillator has another output coupled to the bi-phase modulator.

Finally an amplitude sensitive phase detector is provided which has two inputs, one of which is coupled to the bi-phase modulator and the other to the amplitude modulator. The amplitude modulator controls the amplitude of the output signal of the amplitude sensitive phase detector. On the other hand the bi-phase modulator controls the phase of the output signal. This output signal is now coupled to the input of the voltage-controlled oscillator of the phase-locked loop to positively control its phase even at a time when the input signal changes polarity.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

BRIEF DESCRIPTION OF THE DRAWING

The single figure is a block diagram of a coherent phase detector embodying the phase correction circuit of the present invention.

DESCRIPTION OF THE PREFERRED EMBODIMENT

Referring now to the drawing there is illustrated in block form a preferred embodiment of the present invention forming part of a coherent phase detector. The detector demodulates a bi-phase modulation signal impressed on the input terminal 10. This may be called a phase-shift keying signal with suppressed carrier. Thus depending on the data the phase of the carrier wave is shifted between 0° and 180°. However, the carrier is suppressed so that only the sidebands are transmitted. This bi-phase modulation signal appearing on input terminal 10 is now applied simultaneously to a data phase detector 11 and a loop phase detector 12.

In order to demodulate the received suppressed carrier signal it is necessary to reconstitute the carrier wave. The reconstituted carrier wave must be accurate both in frequency and phase. The frequency of the received wave is subject to change due for example to the Doppler effect and the like. To this end there is provided a voltage-controlled oscillator 14, the output of which is impressed both on the data phase detector 11 as well as on the loop phase detector 12 through a 90° phase shift network 15. Accordingly, the carrier signal obtained from input terminal 10 is demodulated by the data phase detector 11 to produce a positive DC output voltage when the input signal and the carrier signal generated by the oscillator 14 are in phase. On the other hand when the two signals are 180° out of phase a negative output voltage is produced by the data phase detector 11. This output signal may be obtained from the output lead 16 and provides the data output.

In order to maintain the phase of the voltage-controlled oscillator 14 there is conventionally provided a phase-locked loop. This phase locked loop includes the oscillator 14, 90° phase network 15, loop phase detector 12 and a low pass filter 17, the purpose of which will be presently explained. The phase-locked loop further includes a phase correction circuit 2o embodying the present invention. This may also be designated an I-Q multiplier. The phase-locked loop is then closed by the loop filter 21 provided ahead of the oscillator 14 for controlling the oscillator.

In the loop phase detector 12 the incoming phase modulated signal is compared with the output of the voltage controlled oscillator 14, the phase of which is shifted by 90° by the network 15.

When the phase difference between the input signal and the 90° phase shifted oscillator signal obtained from network 15 is between 0° and 90° the output of the loop phase detector 12 is a positive voltage proportional to this phase difference. On the other hand, when the phase difference between the input signal and the 90° phase shifted oscillator signal is between 90° and 180° the output of the loop phase detector 12 is a negative DC voltage having an amplitude proportional to the phase difference. When the phase difference between the input signal and the 90° phase shifted oscillator signal is exactly 90° the output of the loop phase detector 12 is zero volts.

As a result, the output of the loop phase detector 12 is the dynamic error voltage or loop error voltage which is used for controlling the voltage-controlled oscillator 14. Accordingly, the DC output obtained from output lead 22 is the loop output.

The output from the data phase detector 11 is filtered through a low pass filter 24 and similarly the output of the loop phase detector 12 is passed through a low pass filter 17. These filters will eliminate undesired alternating-current components and pass only the data and DC components of the respective output signals.

The filtered signal obtained from low pass filter 24 is applied to a decision circuit 25 which may be called a logic circuit and which responds to both amplitude and polarity of the input signal. Thus when the output signal obtained from data phase detector 11 becomes positive the decision circuit 25 provides a fixed logic or fixed amplitude level as its output or phase change signal which may, for example, be designated (−1). On the other hand, when the output signal obtained from data detector 11 becomes negative the decision circuit 25 provides another fixed logic level as its output which may be designated (+1). Accordingly, the decision circuit 25 produces an output signal which is either positive or negative with a fixed amplitude.

The phase correction circuit 20 now serves the purpose to deliver a corrected loop error signal to the loop filter 21 for controlling the oscillator 14. To this end the phase information provided at output lead 26 of decision circuit 25 and the dynamic error control voltage available from output lead 27 of low pass filter 17 are both applied to the phase correction circuit 20. In turn the phase correction circuit 20 produces an output signal from output lead 28 which becomes the corrected loop error signal and which is applied to the loop filter 21.

The polarity of the corrected loop error signal available from the output lead 28 is determined by the logic state, that is the polarity from (+1) or (−1) obtained from lead 26 of the decision circuit 25. This ensures that the polarity of the error signal at output lead 28 remains correct in spite of the bi-phase transitions that occur in the input modulation signal when the information is demodulated in the data phase detector 11.

Specifically, the phase correction circuit 20 includes a reference oscillator 30 which provides the carrier for a suppressed-carrier amplitude modulator 31. For convenience of explanation the output phase of the reference oscillator 30 is assumed to be 0° at both output terminals 32 and 33. The oscillator output terminal 32 is coupled to the suppressed-carrier amplitude modulator 31 through an adjustable phase shift network 34. On the other hand, the reference oscillator output terminal 33 is connected to a bi-phase modulator 35. The other input to the bi-phase modulator 35 is furnished by the decision circuit output lead 26. Furthermore, the amplitude modulator 31 has a second input provided by the output lead 27 from the loop phase detector 12. This is the positive or negative dynamic error control voltage derived from the loop phase detector 12 and low pass filter 17.

The suppressed-carrier amplitude modulator 31 produces an AC output signal having a magnitude which is proportional to the DC input voltage obtained from lead 27. It has a phase which is either 0° or 180° with respect to that of the wave from the reference oscillator 30 depending upon the polarity of the DC error input signal. Thus, when the DC error input signal is positive the AC output signal has a phase of 0° with respect to the reference signal from the oscillator 30. On the other hand, when the DC error input signal is negative the output signal is 180° out of phase with respect to the reference signal. Moreover, when the DC error input signal shifts polarity the AC output signal from the amplitude modulator 31 also shifts phase by 180°. As a result when the DC input signal amplitude changes either from a positive or a negative polarity through 0 volts to the opposite polarity, the output signal from the amplitude modulator 31 correspondingly goes through 0 volts and shifts phase by 180°.

The AC output from amplitude modulator 31 may be applied through an AC amplifier 37 to one of the inputs of an amplitude-sensitive phase detector 38 which may also be called a phase discriminator. The purpose of the AC amplifier 37 is to compensate for losses which may, for example, be due to mismatch in the phase correction circuit 20 or the like. This may, for example, be caused by transformer losses. The adjustable phase shift network 34 is provided to ensure a proper phase relationship between the two inputs at the amplitude-sensitive phase detector 38. This may be desirable in certain cases because small phase shifts could occur in the transformers and in the AC amplifier 37.

As indicated before the second input of the bi-phase modulator 35 is a logic state supplied by the decision circuit 25 through its output lead 26. It is representative of the phase state of the input. The bi-phase modulator 35 may be considered to be a gating device or a bi-phase switch. It changes the phase of its output signal with respect to that of the reference oscillator 30 upon command from the decision circuit 25. Accordingly, the bi-phase modulator 35 supplies an output signal which is either 0° or 180° out of phase with respect to that of the reference wave furnished by the reference oscillator 30.

When there is no command from the decision circuit 25 to change the phase, the output signal from the bi-phase modulator 35 remains at a phase of 0° or 180°. For purposes of explanation it may be assumed that the steady state phase of the output signal is 0°. The bi-phase modulator 35 serves to provide the reference signal or reference phase as one input to the amplitude-sensitive phase detector 38. The suppressed-carrier amplitude modulator 31 provides the other input which controls the amplitude of the output signal of phase detector 38.

Accordingly the amplitude of the reference signal obtained from bi-phase modulator 35 is such that it only acts to provide switching. It does not influence the magnitude of the output signal from amplitude-sensitive phase detector 38 which might be due to small amplitude variations. Therefore, the magnitude of the output DC signal obtained from output lead 28 or phase detector 38 is proportional only to the amplitude of the input signal from the amplitude modulator 31 and amplifier 37, while its polarity depends only upon the phase of the output signal from the modulator 35 with respect to the phase of the signal provided by amplitude modulator 31. As a result, the phase detector 38 will supply a maximum positive DC output if its two input terminals are in phase and a maximum negative DC output when the two input signals are 180° out of phase.

This output signal appearing on output lead 28 is the sense-corrected loop error voltage which controls the voltage-controlled oscillator 14 with a positive or negative polarity. It now controls the output phase of the oscillator 14 to control the phase of the signal applied to the two detectors 11 and 12.

Table I to which reference is now made illustrates the general application of the phase correction network 20 as a commandable phase or polarity reversing amplifier. It has previously been explained that the phase correction circuit 20 may also be used in a servomechanism, quadriphase demodulator and the like. In other words it can be useful wherever sense or polarity correction is required on command. However, for convenience the operation of the phase correction circuit 20 will now be explained for the particular application shown in the drawing as a portion of a phase locked loop.

Referring to the first line of Table I, let it be assumed that the DC signal which represents the dynamic error control voltage obtained from lead 27 is of positive polarity. This corresponds to a small phase error. Likewise, it will be assumed that the phase change signal obtained from decision circuit 25 available on lead 26 and applied to the bi-phase modulator 35 is in a steady state (−1). Then the magnitude of the output signal from amplitude modulator 31 is proportional to the magnitude of this DC signal. It also has zero phase with respect to the reference signal from oscillator 30. Finally, the output signal from the data phase detector 11 is at a maximum positive level corresponding to a logic state of (−1) at the output of decision circuit 25, this logic signal being available from output lead 26.

Under these conditions the bi-phase modulator 35 applies a 0° reference signal to the phase detector 38. Accordingly, the AC signal from the amplitude modulator 31 which has 0° phase with respect to the oscillator reference wave and the 0° reference wave provided from the bi-phase modulator 35 are both in phase.

Therefore, the DC output signal produced by the phase detector 38 has the same polarity, that is a positive polarity and has the same magnitude as that of the DC signal applied to the amplitude modulator 31. This may be termed condition 1. To repeat again, the output signal on lead 28 has the same polarity as the

TABLE I

| Loop error signal from Lead 27 to Modulator 31 | Phase of output signal from Modulator 31 to Detector 38 (°) | Phase change signal from Lead 26 to Modulator 35 | Phase of output signal from Modulator 35 to Detector 38 (°) | DC polarity of output signal on Lead 28 from Detector 38 |
|---|---|---|---|---|
| +DC | 0 | −1 | 0 | +DC. |
| −DC | 180 | −1 | 0 | −DC. |
| +DC | 0 | +1 | 180 | −DC. |
| −DC | 180 | +1 | 180 | +DC. |

input signal on lead 27 because the phase change signal on lead 26 is at the (−1) logic level which commands no change.

Assume now that condition 1 still exists but that a negative DC polarity of small magnitude exists at the output of the loop phase detector 12. This may be the result of carrier phase drift at the input terminal 10 with respect to the phase of the wave developed by the voltage-controlled oscillator 14. The resultant condition is shown on the second line of Table 1 and may be called condition 2. Since the phase error is much less than 180° the output of the data phase detector 11 is still positive. Therefore, the logic state of the signal at the output lead 26 of decision circuit 25 remains (−1). This then maintains a 0° reference signal from bi-phase modulator 35 to the phase detector 38. However, the DC input signal or loop error signal obtained from lead 27 and impressed on amplitude modulator 31 has gone negative.

This results in the phase of the output signal from modulator 31 to detector 38 changing to 180°. Since the two inputs of the phase detector 38 now have a 180° phase difference the amplitude of the output signal will be proportional to the input level to the amplitude modulator 31. However, the output signal will change polarity to a negative sense corresponding to the negative polarity of the dynamic error voltage occuring at the input lead 27 as applied to the amplitude modulator 31. In other words, as the polarity of the signal at the output of the loop phase detector 12 changes sense so does the signal at the output lead 28 applied to the voltage-controlled oscillator 14. To summarize again the output signal on lead 28 is negative as is the input signal from lead 27 because the phase change signal (−1) commands no change.

Assuming now once again that the phase-locked loop is locked in accordance with condition 1 but that the modulation signal at input terminal 10 realizes a phase transition of 180° with respect to the phase of the reference signal from oscillator 14. Then the resulting conditon may be called condition 4 and is shown in the fourth line of Table I. Now the phase data detector 11 senses a change in the state of the phase. This results in the decision circuit 25 providing a logic state (+1) to the bi-phase modulator 35. In other words the phase change signal commands a change of the polarity of the output signal. Accordingly the bi-phase modulator 35 changes its output phase reference from 0° to 180°. Likewise, the polarity of the loop error signal from the loop phase detector 12 changes from a positive to a negative DC level. This in turn causes the output signal from the amplitude modulator 31 to provide a 180° phase reference to the amplitude-sensitive phase detector 38. Since both signals at the phase detector 38 have a 0° phase difference corresponding to 180° phase on both input terminals, the polarity of the output signal or lead 28 remains positive.

The remaining conditions such as condition 3 corresponding to line three of Table I may be described in a similar manner. They result in the same effects as far as the operation of the phase-locked loop is concerned. This is true because the remaining conditions are simply mirror images of those already described.

To summarize again, the polarity of the output signal on lead 28 is the same as the polarity on lead 27 as long as the phase change signal is (−1) indicating that no change of the phase should be effected. On the other hand, if the phase change signal is (+1) commanding that a change should be effected, then the output signal on lead 28 has a polarity opposite to that of the signal on the input lead 27.

There has thus been disclosed a phase correction circuit for a demodulator which operates on AC rather than DC hence obviating all the well known disadvantages of DC amplifiers. The phase correction circuit of the invention may form part of a demodulator for a phase-shift keying, suppressed-carrier communication system and will provide the capability of increased data rate transmission. It is also feasible to provide additional commands by simply adding another bi-phase modulator or switch between the existing modulator and the phase detector. If additional gain is required this can be accomplished by an AC amplifier. The necessary circuitry is relatively simple and straight forward and will prevent the loss of phase lock while the input signal changes phase.

What is claimed is:

1. In a phase-locked loop demodulator for demodulating a bi-phase modulated, suppressed-carrier signal, the demodulator being of the type including a data phase detector, a loop phase detector, each of said detectors being coupled to a source of input signals, a 90° phase shift network connected between said detectors, first means coupled to said loop phase detector for generating a direct-current loop error signal, a voltage-controlled oscillator having its output connected between said data phase detector and said phase shift network, said first means generating a direct-current loop error signal of one polarity in response to the phase difference between the input signal and the phase-shifted reference signal being between 0° and 90°, and said loop error signal being of the opposite polarity when said phase difference is between 90° and 180°, second means coupled to said data phase detector for generating a phase change signal of one polarity when the output of said data phase detector is of a predetermined polarity and for generating a phase change signal of the opposite polarity when the data phase detector output is of a polarity opposite to said predetermined polarity, the improvement comprising:

a. a phase correction circuit for correcting the phase of said voltage-controlled oscillator and including;
b. a suppressed-carrier amplitude modulator coupled to said first means;
c. a reference oscillator having one of its outputs coupled to said amplitude modulator;
d. a bi-phase modulator coupled to said second means, said reference oscillator having another output coupled to said bi-phase modulator; and
e. an amplitude-sensitive phase detector having its inputs coupled to said bi-phase modulator and to said amplitude modulator, said amplitude modulator controlling the amplitude of the output signal of said amplitude-sensitive phase detector while said bi-phase modulator controls the phase thereof, the output of said amplitude-sensitive phase detector being coupled to the input of said voltage-controlled oscillator to supply a corrected loop error signal, whereby the phase of said voltage-controlled oscillator is controlled even when the input signal changes polarity.

2. A loop demodulator as defined in claim 1 wherein an adjustable phase shift network is coupled between said reference oscillator and said suppressed-carrier amplitude modulator.

3. A loop demodulator as defined in claim 1 wherein an alternating-current amplifier is coupled between said suppressed-carrier amplitude modulator and said amplitude-sensitive phase detector for controlling the gain in said phase correction circuit.

4. A multiplier for multiplying an in-phase signal with a phase quadrature signal comprising:

a. a suppressed-carrier amplitude modulator having an input to which the phase quadrature signal is adapted to be applied;

b. a bi-phase modulator having an input terminal to which the in-phase signal is adapted to be applied;

c. a reference oscillator having its output terminal coupled to an input terminal of each of said bi-phase modulator and said amplitude modulator; and d. an amplitude-sensitive phase detector having a first input terminal coupled to said amplitude modulator and having a second input terminal coupled to said bi-phase modulator, whereby a phase corrected output signal may be derived from said amplitude-sensitive phase detector.

5. A multiplier as defined in claim 4 wherein and adjustable phase shift network is coupled between said reference oscillator and said amplitude modulator for adjusting phase in said multiplier.

6. A multiplier as defined in claim 4 wherein an alternating-current amplifier is coupled between said amplitude modulator and said phase detector for controlling the gain of said multiplier.

* * * * *